Figure 1:
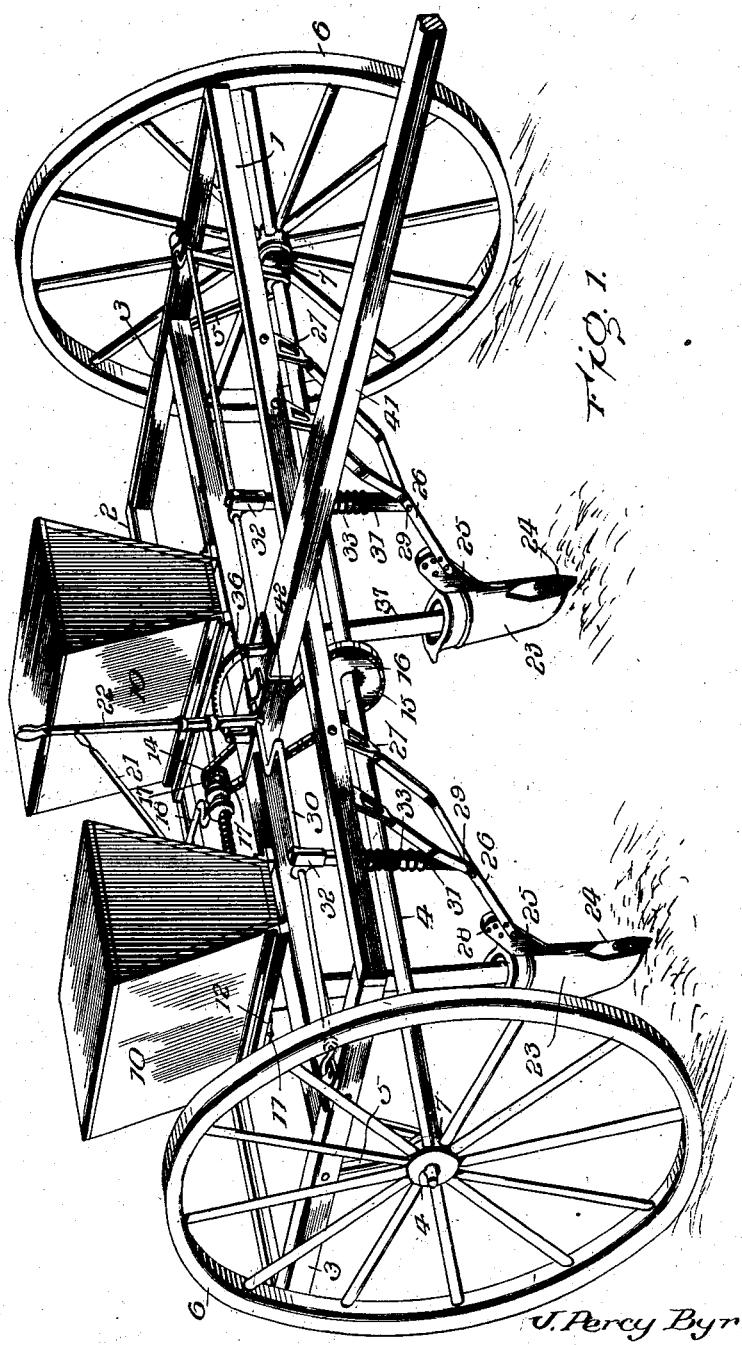

No. 739,385. PATENTED SEPT. 22, 1903.
J. P. BYRNE.
PLANTER.
APPLICATION FILED MAR. 12, 1903.
NO MODEL. 4 SHEETS—SHEET 1.

Witnesses
Gladys L. Thompson

Inventor
J. Percy Byrne
By R.S.&A.B. Lacey
Attorneys

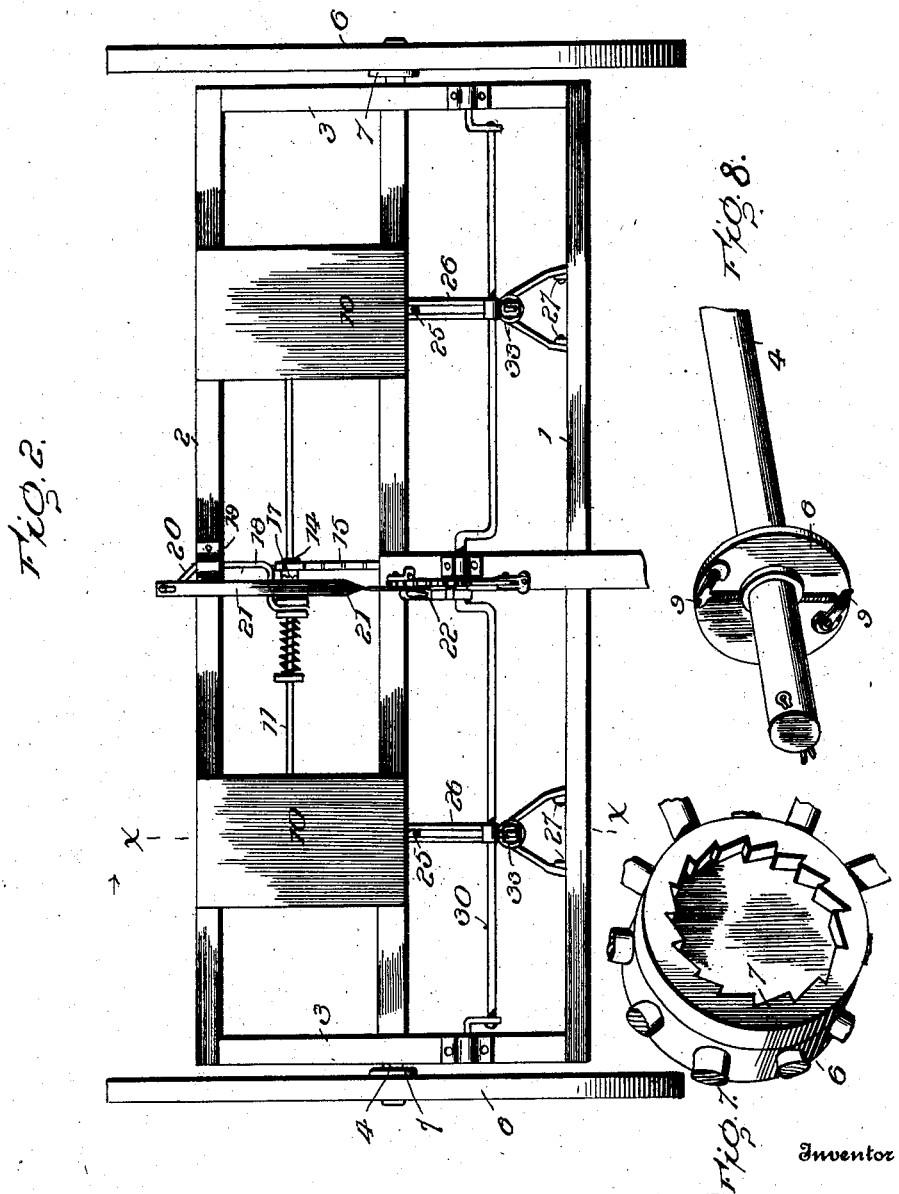

No. 739,385. PATENTED SEPT. 22, 1903.
J. P. BYRNE.
PLANTER.
APPLICATION FILED MAR. 12, 1903.
NO MODEL. 4 SHEETS—SHEET 3.
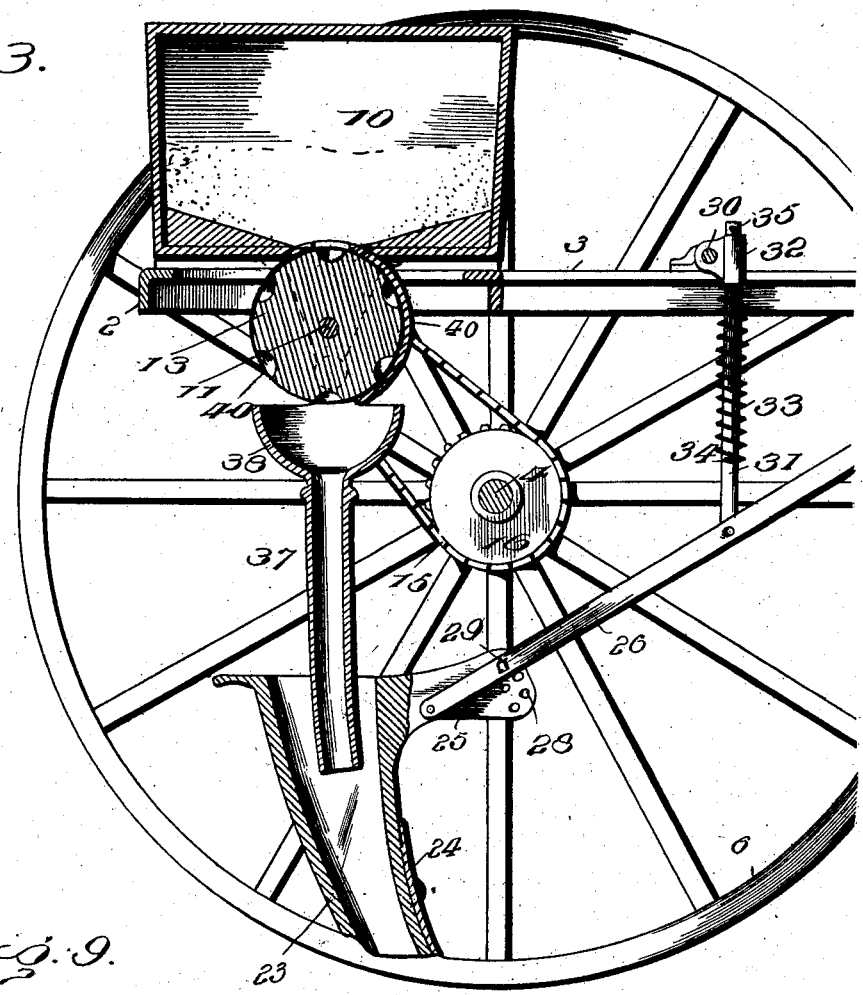
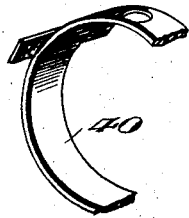
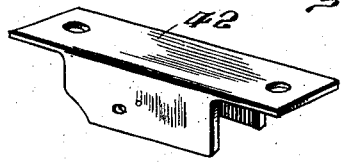
Witnesses
Inventor
J. Percy Byrne
Attorneys No. 739,385. PATENTED SEPT. 22, 1903.
J. P. BYRNE.
PLANTER.
APPLICATION FILED MAR. 12, 1903.
NO MODEL. 4 SHEETS—SHEET 4.
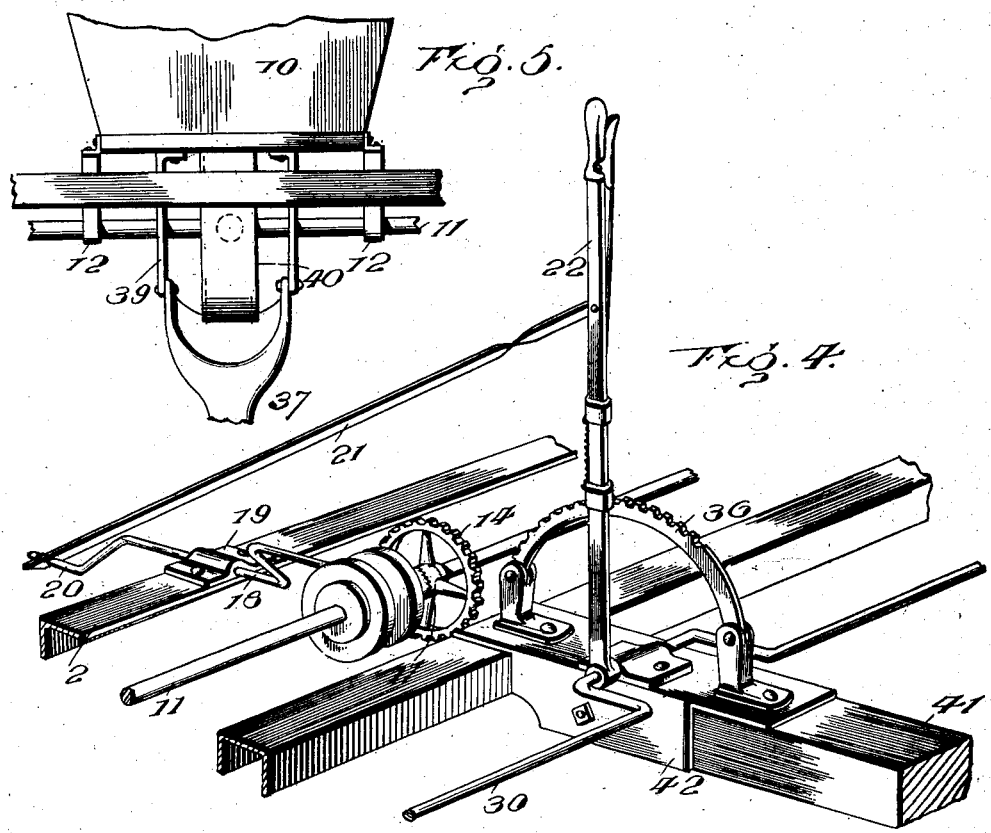
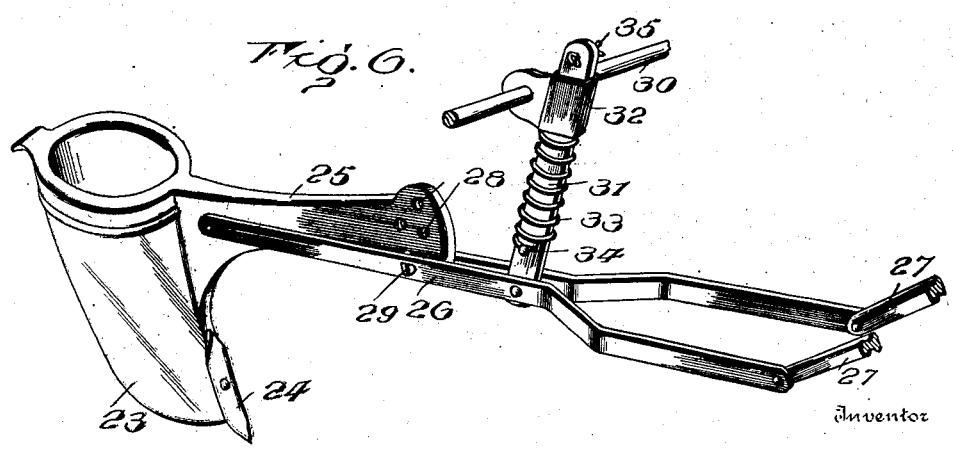
Witnesses
Inventor
J. Percy Byrne
By
Attorneys No. 739,385.

Patented September 22, 1903.

UNITED STATES PATENT OFFICE.

JOHN PERCY BYRNE, OF PARNELL, MICHIGAN.

PLANTER.

SPECIFICATION forming part of Letters Patent No. 739,385, dated September 22, 1903.

Application filed March 12, 1903. Serial No. 147,516. (No model.)

*To all whom it may concern:*

Be it known that I, JOHN PERCY BYRNE, a citizen of the United States, residing at Parnell, in the county of Kent and State of Michigan, have invented certain new and useful Improvements in Planters, of which the following is a specification.

This invention relates to machines for sowing grain in drills or parallel rows, and provides simple and effective means whereby the seeding mechanism, drills, and operating means are at all times under control of the driver to admit of varying the depth of planting and throwing the machine into and out of gear.

A further purpose of the invention is to mount the drills so as to admit of their inclination to meet desired requirements and allow of their yielding, so as to clear obstructions without working serious injury to the machine.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view of a planter embodying the invention. Fig. 2 is a top plan view thereof. Fig. 3 is a longitudinal section about on the line X X of Fig. 2 looking to the right, as indicated by the arrow. Fig. 4 is a detail perspective view of the means for throwing the seeding mechanism into and out of gear and simultaneously raising and lowering the drills. Fig. 5 is a detail view of the lower portion of the hopper, the seed-dropping wheel, and the upper portion of the grain-tube. Fig. 6 is a detail perspective view of a drill and its mountings. Fig. 7 is a detail perspective view of the hub portion of a ground or supporting wheel. Fig. 8 is a detail perspective view of an end portion of the axle, showing the disk carrying the pawls which coöperate with the ratchet-teeth of the ground-wheel hub. Fig. 9 is a detail perspective view of the guard for inclosing a peripheral portion of the seed-dropping wheel. Fig. 10 is a perspective view of the attachment for connecting the tongue to the framework of the planter.

Corresponding and like parts are referred to in the following description and indicated in all the views of the drawings by the same reference characters.

The framework of the machine comprises front bar 1, rear bar 2, and longitudinal bars 3, the same being substantially joined at their ends or corners of the frame. The axle 4 is journaled to the hangers 5, pendent from the longitudinal bars 3, and is provided with ground-wheels 6, loosely mounted upon its arms or spindles and connected thereto by a ratchet mechanism of any type. As shown most clearly in Figs. 7 and 8, the hub of each ground-wheel is provided with ratchet-teeth 7, and the axle 4 is provided with a disk 8, having spring-actuated pawls 9 applied thereto for coöperation with the teeth 7, whereby in the forward movement of the planter over the field the axle 4 is positively driven, but upon backward movement the ratchet-teeth 7 ride upon the pawls 9 and prevent movement being imparted to said axle.

The hoppers or seedboxes 10 are secured to the framework in any desired and convenient position, and their bottoms slope to a central discharge, as indicated most clearly in Fig. 3. A shaft 11, journaled in hangers 12, is provided with seed-dropping wheels 13, secured for rotation therewith and arranged to operate in the discharge-openings of said hoppers and provided at intervals in their periphery with pockets or depressions to receive the desired grain to be planted. A gear-wheel 14 is loosely mounted upon shaft 11 and is adapted to be driven from axle 4 by means of a drive-chain 15 and gear-wheel 16, the latter being secured to axle 4, so as to turn therewith. A clutch 17 coöperates with the gear-wheel 14 to cause shaft 11 to rotate therewith when the planter is in operation. Clutch 17 is composed of complementary parts, one being secured or applied to a side of gear-wheel 14 and the other being slidable upon shaft 11 and keyed thereto by a feather and spline or like connection, so as to rotate therewith. When the part 17 is in clutched engagement with gear-wheel 14 and the latter is rotated, corresponding movement is imparted to shaft 11; but when clutch 17 is unshipped gear-wheel 14 is adapted to rotate loosely upon shaft 11 without imparting movement thereto or to the seeding mechanism, thereby admitting of the machine being drawn over the field without operating the seeding or planting mechanism. A shipper coöperates with clutch 17 to throw it into and out of action and, as shown, consists of a shaft 18, mounted in bearing 19, secured to bar 2, and having its front end in engagement with clutch 17 and provided at its rear end with crank 20 for coöperation with the longitudinally-slotted end of bar 21, by means of which said crank is adapted to be operated by means of lever 22.

The grain-drills comprise boots 23, having openers 24 at their lower ends and provided with forwardly-extended stems 25, to which the lower rear ends of the drag bars or beams 26 are pivoted, said beams comprising companion bars embracing opposite sides of stems 25 and spread at their forward ends and pivoted to brackets 27, pendent from the front bar 1. The beams 26 are pivoted at their lower ends to the rear ends of stems 25 and have adjustable connection with the front ends of said stems to admit of boots 23 being inclined more or less, as may be required, according to the nature of the work and soil. The front end of each stem 25 is provided with a series of openings 28, and a pin 29 is adapted to pass through openings in the bars of beam 26 and through any selected opening 28, so as to hold the boots in an adjusted position. The drills are suspended from crank-shaft 30 by means of bars 31, pivoted at their lower ends to beams 26 and having their upper ends passed loosely through boxes or cuffs 32, pivotally mounted upon crank portions of shaft 30. A coil-spring 33 is interposed between the cuff or box 32 and a pin or stop 34 applied to the lower portion of each bar 31 and exerts a downward pressure, so as to hold the drills in the ground, but yet admit of their upward movement when meeting with a root, stone, or like obstruction. A cotter-pin 35 is applied to the upper end of each bar 31 to limit its downward movement with reference to the box or cuff 32. By turning the shaft 30 the drills may be raised more or less or lifted entirely from the ground, as desired. For turning shaft 30 in its bearings lever 22 is provided and made fast at its lower end to said shaft and is provided with the usual latch-bolt for coöperation with a notched bar 36, so as to hold shaft 30 and drills in an adjusted position. The grain from each of the hoppers is directed into the respective boots by means of a tube 37, provided at its upper end with a cup 38, which is arranged adjacent to the lower portion of the seed-dropping wheel and pivotally suspended from hangers 39, applied to the hopper. To prevent wind blowing the grain from the pockets of wheels 13 and to insure delivery of same into cups 38, a guard 40 is arranged to encircle one-half of the peripheral portion of the seed-dropping wheel, as shown most clearly in Fig. 3.

The pole or tongue 41 is connected, by means of an iron or attachment 42, to the frame of the machine, said part 42 being of box form, so as to embrace three sides of the tongue.

The operating parts being assembled substantially as herein set forth and the machine being drawn over the field, the seed delivered into the boots 23 is deposited into drills formed by openers 24, and when it is required to throw the seeding mechanism out of gear lever 22 is operated to effect unshipping of clutch 17, and at the same time shaft 30 is turned in its bearings and lifts the drills out of the ground, thereby throwing the planter out of action. This is of advantage when turning the machine at the end of a row preliminary to recrossing the field.

Having thus described the invention, what is claimed as new is—

1. In a planter, and in combination with the seeding mechanism comprising an operating-shaft, drilling devices, and operating means for said shaft, a lever for effecting vertical adjustment of the drilling devices, a shaft arranged about at a right angle to the operating-shaft of the seeding mechanism and provided at opposite ends with cranks, a bar connecting the outer crank of said shaft with said lever, and a clutch mounted upon the shaft of the seeding mechanism and having the inner crank of the crank-shaft in engagement with the movable member to throw the clutch out of engagement simultaneously with lifting the drilling devices from the ground, substantially as set forth.

2. In a planter, the combination of an axle, ground-wheels mounted on said axle and having ratchet connection therewith, a shaft for operating the seeding mechanism and connected with the axle to receive motion therefrom, a clutch mounted upon said shaft, shaft 18 having inner and outer cranks, the inner crank coöperating with said clutch, drilling devices, an operating-lever for effecting vertical adjustment of the drilling devices, and a rod connecting said operating-lever with the outer crank of shaft 8, substantially as set forth.

In testimony whereof I affix my signature in presence of two witnesses.

JOHN PERCY BYRNE. [L. S.]

Witnesses:
PATRICK REGAN,
DAN DOYLE.